Jan. 5, 1932.                    H. W. SNYDER                    1,839,273
                               GEARED LOCOMOTIVE
                               Filed Dec. 3, 1928

INVENTOR
Herbert W. Snyder
BY
Synnestvedt & Lechner
ATTORNEYS

Patented Jan. 5, 1932

1,839,273

UNITED STATES PATENT OFFICE

HERBERT W. SNYDER, OF LIMA, OHIO

GEARED LOCOMOTIVE

Application filed December 3, 1928. Serial No. 323,319.

This invention relates to geared locomotives, and particularly to truck structures therefor.

In the ordinary form of geared locomotive there are a plurality of swivelling trucks, the axles of which are connected by bevel gears to a common drive-shaft extending longitudinally of the locomotive at the right-hand side. Such drive-shaft is provided with universal joints and slip-joints to permit swivelling of the trucks, and is driven from a set of cylinders which are generally mounted vertically at the right-hand side of the locomotive boiler.

The section or portion of the shaft which lies alongside a truck is supported in bearings mounted on the truck frame, and as long as there is little or no end play in the axles of the truck the gears on said axles will remain in mesh with the gears on said shaft. As wear develops, however, particularly at the left-hand ends of the axles, which usually bear against fixed thrust blocks, the gears force the axles to the left (with relation to the truck frame and the drive shaft) which eventually causes disengagement of the driving and driven gears, unless shims be inserted at the left ends of said axles to compensate for said wear.

I aim by my invention to overcome these difficulties encountered in geared locomotive trucks, to eliminate the necessity for shims to take up wear, to insure the full enmeshing of the bevelled gears at all times, and to simplify adjustments for wear or lost motion.

More particularly, the invention contemplates the provision of a novel form of truck box and thrust bearing which provides for gradual or progressive adjustment for wear, and which makes such adjustment conveniently possible at any and all times without dismounting or disassembling any parts of the structure whatever.

Other objects of the invention are: to provide means for giving a constant visible indication of the extent of wear of the thrust bearing; to make readily renewable the wearing element or bearing face of said bearing; and to insure the timely renewal of such wearing element before it has passed beyond the range of available adjustment.

How these objects and advantages are attained, together with such others as are incident to the invention or will occur to those skilled in this art, will be clear from the following description, reference being had to the accompanying drawings, in which.

Figure 1:
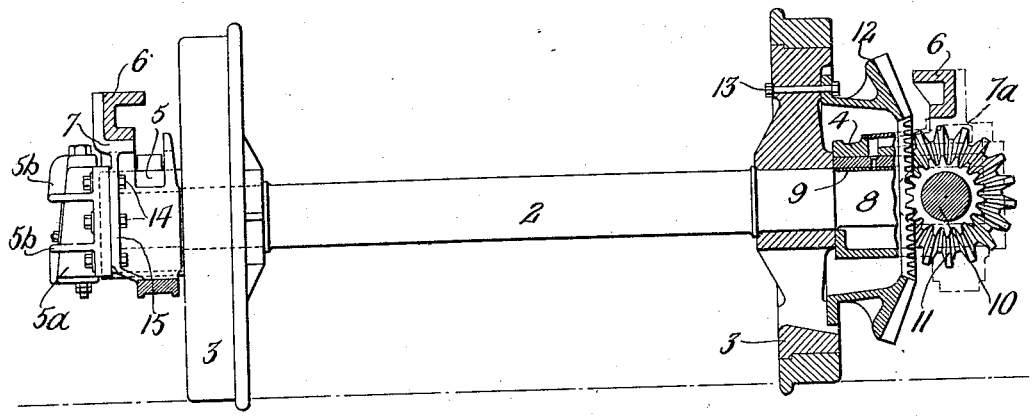
Figure 1 is a rear elevation of a geared locomotive truck structure, with certain parts omitted and others shown in section.

Referring first to Fig. 1, it will be seen that I have illustrated the rear axle 2 and wheels 3, 3 of a geared locomotive truck, having right and left boxes 4, 5, supporting longitudinal truck frame members 6, 6, by means of the truck pedestal structures 7, 7a. At the right-hand end of axle 2 the journal 8 has a bearing 9 in box 4, the pedestal structure 7a, in which said box is mounted, being of yoke-like form (as indicated in outline) to permit the passage of drive-shaft 10. The shaft 10 carries a bevel gear 11 for each axle, said gear being meshed with the annular bevel gear 12, which is secured to the wheel, as by bolts 13.

Figure 2:
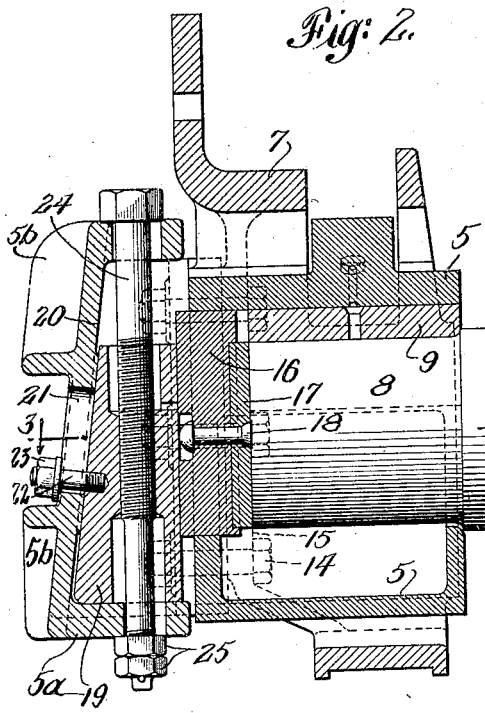
Figure 2 is an enlarged vertical, longitudinal, mid-section of the left-hand axle box, and associated structure, of Fig. 1, with the axle journal shown in elevation.
Figure 3:
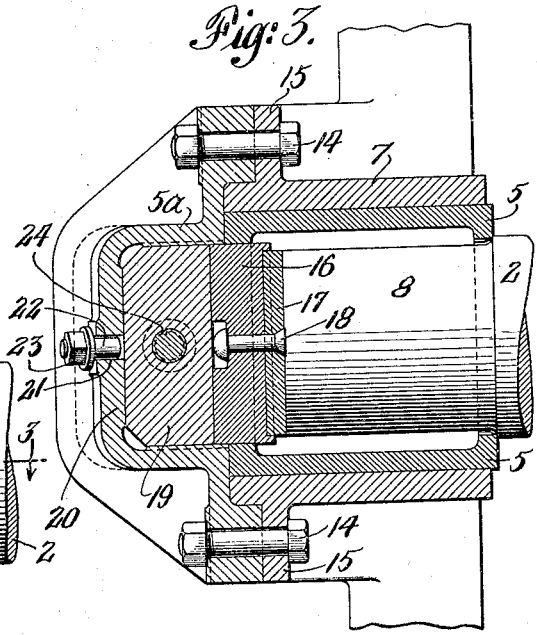
Figure 3 is a horizontal section of the same structure, taken on the line 3—3 of Fig. 2, with the journal again shown in elevation.

At the left-hand end of axle 2, as best seen in Figs. 2 and 3, the journal 8 rides in a bearing 9 housed in box 5 which is mounted in the pedestal structure 7. Secured, as by bolts 14, to the vertical flanges 15 of the pedestal structure, is a journal box cover or lid 5a, which is preferably provided with stiffening webs 5b to take the strain of the thrust imparted by axle 2 to the thrust bearing device now to be described.

The adjustable thrust bearing device includes a thrust block 16 carrying a renewable brass wear element or bearing face 17, which latter may conveniently be secured to the block by a rivet 18. The outer face of block 16 bears against the flat inner face of a vertically disposed wedge member 19, said wedge having its sloping face positioned against the inside of the sloping portion 20 of cover member 5a. This portion of the cover is provided with a slot 21 through which extends a stud 22 carried by the wedge 19. The stud may be provided with a head 23 to retain the wedge against the inclined part 20 of the lid so as to prevent rattling of the wedge at times when it is not subjected to thrust. Gradual adjustment of the wedge is obtainable by means of the bolt 24, which is threaded into the wedge and retained at the bottom by lock nuts 25.

The operation of the device will now be seen to be as follows:

When the locomotive is put into service, with the gears properly in mesh, the liner or wear element 17 is of the proper thickness to prevent end-play of the axle 2 when the wedge 19 is at its lowermost position (as shown in Fig. 2). At this point, the indicating stud 22 is also at the bottom of its slot 21. As wear develops, it is compensated for by turning the bolt 24 (which may be done with an ordinary wrench, and without disassembling any parts) so as to raise the wedge.

The range of travel of the wedge, and the degree of its slope, are so proportioned with relation to the thickness of the wear plate 17 that, when the latter has been worn to the extreme practical limit, the wedge will have attained its extreme upward position. The indicator 22 is then also at the upper limit of its slot 21, giving at that point a visible indication that the wear plate should be renewed. Obviously, it further gives, at all times, a definite indication of the extent of wear of the plate, in the intermediate stages of wear.

By the mere removal of the cover 5a, which carries with it, as a unit, the wedge, adjusting means, and indicator, the thrust bearing may be lifted out endwise of the axle (without disturbing the box or pedestal structure) and a new wear plate may be installed.

What I claim is:—

1. In a truck structure having a gear-driven axle, outside journal boxes for said axle, and a thrust bearing associated with one of said boxes provided with a means of adjustment for taking up lost motion and positioned to react against the end thrust of the gears.

2. In a truck structure having a gear-driven axle, a thrust bearing provided with a wedging means of adjustment for keeping gears in mesh and positioned to react against the end thrust of the gears.

3. In combination, a geared locomotive truck having axles driven from a common shaft, and for each axle an independent thrust bearing having a wear plate, an adjustable wedge for the bearing, and a wedge supporting cap, all so constructed and proportioned that when the wedge attains its maximum adjustment the plate has reached its practical limit of wear.

4. In combination, a geared locomotive truck having axles driven from a common shaft, and for each axle an independent thrust bearing having a wear plate, an adjustable wedge for the bearing, and a wedge supporting cap, all so constructed and proportioned that when the wedge attains its maximum adjustment the plate has reached its practical limit of wear, together with means constructed to indicate said conditions.

5. In a geared locomotive, a driving axle, a thrust bearing therefor, and an adjustment device for the bearing to take up wear, together with an indicator showing the extent of wear.

6. A railway vehicle having a driving axle subject to end thrust when driving, and a thrust bearing device for said axle comprising a thrust block and a continuously-adjustable retaining means therefor positioned at the end of the axle opposite the driving means to take the end thrust reaction thereof.

7. A railway vehicle having a driving axle subject to end thrust when driving, and a thrust bearing device for said axle comprising a thrust block and a continuously-adjustable retaining means therefor, together with a renewable wear element on said block.

8. In combination with a gear-driven locomotive axle, a bearing box therefor, a thrust bearing associated therewith, a cover for the box, and an adjustable wedge means between the cover and the bearing positioned at the end of the axle opposite the driving means to take the end thrust reaction thereof.

9. In combination with a gear-driven locomotive axle, a bearing box therefor, a thrust bearing associated therewith, a cover for the box, and an adjustable wedge means between the cover and the bearing positioned at the end of the axle opposite the driving means to take the end thrust reaction thereof, together with an adjusting device for the wedge means accessible from without the cover.

10. In combination with a gear-driven locomotive axle, a bearing box therefor, a thrust bearing associated therewith, a cover for the box, and an adjustable wedge means between the cover and the bearing, together with an indicator associated with the adjustable wedge means to show its adjustment.

11. In combination with a gear-driven locomotive axle, a bearing box therefor, a thrust bearing associated therewith, a cover for the box, and an adjustable wedge means between the cover and the bearing, together with an indicator associated with the adjustable wedge means giving adjustment indications exteriorly of the cover.

12. A multi-axle locomotive gear-driven truck having, for each driving-axle, a journal box structure including a cover member with a sloping area, a thrust bearing in the box, and an adjustable wedge member co-operating on one face with the bearing and on the other face with the sloping area.

13. A multi-axle locomotive gear-driven truck having, for each driving-axle, a journal box structure including a cover member with a sloping area, a thrust bearing in the box, and an adjustable wedge member co-operating on one face with the bearing and on the other face with the sloping area, together with means for shifting said wedge.

14. A multi-axle locomotive gear-driven truck having, for each driving axle, a journal box structure including a cover member with a sloping area, a thrust bearing in the box, and an adjustable wedge member co-operating on one face with the bearing and on the other face with the sloping area, together with inter-cooperating means on wedge and cover to indicate the adjustment of the wedge.

15. In combination with a truck having an axle driven from one end, an axle thrust bearing at the other end including a renewable wear element and an adjusting means having a range of travel so proportioned to the thickness of the wear element that the limit of adjustment corresponds to the maximum permissible wear of the element.

16. In combination with a truck having an axle driven from one end, an axle thrust bearing at the other end including a renewable wear element and an adjusting means having a range of travel so proportioned to the thickness of the wear element that the limit of adjustment corresponds to the maximum permissible wear of the element, together with an indicator giving a constant indication of the degree of adjustment.

17. A locomotive truck, having a gear-driven axle, and an outside journal box structure including a box, a thrust bearing therein, a removable cover for the box, and adjusting means for the bearing carried by the cover, said bearing and associated parts being positioned at one end of the axle only and reacting against the uni-directional thrust of the gears.

18. A locomotive truck, having a gear-driven axle, and an outside journal box structure including a box, a thrust bearing therein, a removable cover for the box, and adjusting means for the bearing carried by the cover and removable as a unit therewith from the box, said bearing and associated parts being positioned at one end of the axle only and reacting against the uni-directional thrust of the gears.

In testimony whereof I have hereunto signed my name.

HERBERT W. SNYDER.